United States Patent [19]
Liu et al.

[11] Patent Number: 6,070,011
[45] Date of Patent: May 30, 2000

[54] COMPILER FOR PERFORMING A LOOP FUSION, DEPENDENT UPON LOOP PEELING AND/OR LOOP REVERSAL

[75] Inventors: Jiyang Liu; Robert Gottlieb, both of Westford, Mass.; Andrew E. Ayers, Amherst, N.H.

[73] Assignee: Hewlett-Packard Co., Palo Alto, Calif.

[21] Appl. No.: 08/955,075

[22] Filed: Oct. 21, 1997

[51] Int. Cl.[7] .................................................. G06F 9/45
[52] U.S. Cl. ......................................... 395/709; 395/705
[58] Field of Search .................................. 395/705, 708, 395/709

[56] References Cited

U.S. PATENT DOCUMENTS

| | | | |
|---|---|---|---|
| 5,303,357 | 4/1994 | Inoue et al. | 395/709 |
| 5,457,799 | 10/1995 | Srivastava | 395/709 |
| 5,491,823 | 2/1996 | Ruttenberg | 395/709 |
| 5,548,761 | 8/1996 | Balasundaram et al. | 395/707 |
| 5,752,037 | 5/1998 | Gornish et al. | 395/709 |
| 5,822,593 | 10/1998 | Lamping et al. | 395/709 |

OTHER PUBLICATIONS

Bacon, D.; Graham, S.; Sharp, O.; "Compiler Transformations for High Performance Computing"; ACM Computing Surveys; vol. 26, No. 4, pp. 345–420, Dec. 1994.

Proceedings of the Sixth International Conference on Architectural Support for Programming Languages and Operating Systems, Oct. 1994, S. Carr et al., "Compiler Optimizations for Improving Data Locality".

Manjikian, N.; Abdelrahman, T.; "Fusion of Loops for Parallelism and Locality"; IEEE Transactions on Parallel and Distributed Systems; vol. 8, Issue 2, pp. 193–209, Feb. 1997.

Sha, E.; Lang, C.; Passos, N.; "Polynomial–Time Nested Loop Fusion with Full Parallelism"; Proceedings of the 1996 International Conference on Parallel Processing; vol. 3, pp. 9–16, Aug. 1996.

McKinley, K.; Carr, S.; Tseng, C.; "Improving Data Locality with Loop Transformations"; ACM Transactions on Programming Languages and Systems; vol. 18, No. 4, pp. 424–453, Jul. 1996.

Chesney, D.; Cheng, B.; "Generalizing the Unimodular Approach"; International Conference on Parallel and Distributed Systems; pp. 398–404, Dec. 1994.

Pugh, W.; "Uniform Techniques for Loop Optimization"; Proceedings of the 1991 International Conference on Supercomputing; pp. 341–352.

*Primary Examiner*—Tariq R. Hafiz
*Assistant Examiner*—Brian Sattizahn

[57] ABSTRACT

A compile method employs loop fusion to improve execution of a first loop and a second loop in a code sequence. A compile method initially peels one or more loop iterations from one of the loops to cause each of the loops to exhibit an equal number of loop iterations. Thereafter, an attempt is made to fuse the first and second loops, upon a condition that the resulting fused loop produces a same computational result as would be produced if the first loop and second loop were not fused. If the condition is not met, a loop reversal is performed on one of the loops and a fusing action is again attempted; if the attempted fusing action of the loops does not fulfill the condition, a loop reversal is performed on the other loop and a fusing action is again attempted. The combined loop peeling/loop reversal actions provide a higher probability of an ability to fuse the loops than otherwise.

8 Claims, 2 Drawing Sheets

COMPILER FOR PERFORMING A LOOP FUSION, DEPENDENT UPON LOOP PEELING AND/OR LOOP REVERSAL

FIELD OF THE INVENTION

This invention relates to a compiler optimization technique which employs loop peeling and loop reversal to enable a legal and profitable loop fusion transformation to improve the run-time efficiency of a program, while preserving its correctness.

BACKGROUND OF THE INVENTION

As is known to those skilled in the art, there are a number of techniques employed by compiler programs to improve the execution efficiency of program sequences. A description of some of these procedures can be found in chapter 10 of "Compilers", Aho et al., Addison Wesley (1986). Principal methods for improvement of execution efficiency of program routines involve actions with respect to loops that are present therein. Hereafter, some background will be presented with respect to loop operations.

A loop refers to a repeated execution of a sequence of one or more computer instructions. The sequence of instructions is called the loop body. The number of times the loop body is to be repeated is called the number of iterations. Most programming languages provide one or more form of loop constructs. An example of a FORTRAN DO-Loop is shown below:

```
       (a)  (b) (c) (d)
    DO I = 1,  3,  1

A(I) = I {—— loop body

ENDDO
``` where:

(a)=Do-variable (b)=Initial expression (c)=Final expression (d)=Increment expression A DO-Loop Contains Three Parts 1. A DO statement which signifies the beginning of a DO-Loop construct and contains a DO-variable, an initial expression, a final expression, and an increment expression. Before the loop body is executed, the DO-variable is assigned the value of the initial expression. At the end of each successive iteration of the loop body, the DO-variable is incremented by the value of the increment expression and its value is compared against the final expression. If the value of the DO-variable is less than or equal to that of the final expression, then the loop body is executed; otherwise the iteration is terminated.

In the FORTRAN example above, the number of iterations is 3 because at the end of the third iteration the value of the DO-variable becomes 4 which is greater than that of the final expression. When the value of the increment is 1 it can be omitted from the DO-statement.

2. A loop body which contains one of more statements to be repeatedly executed on each iteration of the loop.

3. An ENDDO statement which signifies the end of a DO-Loop construct.

The loop body often contains a computation action which involves an array. An array is a group of consecutive memory locations that are referenced by the same name. Each individual memory location is referred to as an element of the array and is specified by a name plus a subscript expression inside a pair of parentheses.

In the example above, an array having the name "A" is used. The notation A(I) refers to the Ith element of the array. For instance, when the value of I is 1, A(I) is the same as A(l) and both refer to the first element of array A. Therefore the computation performed by the DO-Loop is to assign the current value of the DO-variable I to the Ith element of array A. After the DO-Loop is executed the first three elements of array A contain the values 1, 2, 3 respectively:

| A: | A(1) | A(2) | A(3) |
|----|------|------|------|
|    | 1    | 2    | 3    |

The notation (1, 2, 3) is used to indicate the values of array elements A(1), A(2), and A(3), in that order.

Loop peeling is a procedure by which a first or final iteration is removed from a loop and the number of iterations of the loop is appropriately reduced by adjusting the value of the initial or the final expression, depending on whether the first or last iteration is removed. An example of loop peeling is given below where the first iteration is removed from the loop; the initial expression is changed from 1 to 2; and the number of iterations of the loop is reduced from 3 down to 2.

```
DO I = 1, 3              A(1) = 1
   A(I) = I       ---→   DO I = 2, 3
ENDDO                       A(I) = I
                         ENDDO
```

It is also possible to remove more than 1 iteration from either or both ends of a loop.

Loop reversal is a further action that is used to improve loop execution and is the transformation by which the direction in which loop iterations are performed is reversed. An example of loop reversal is shown below:

```
DO I = 1, 3              DO I = 1, 3
   A(I) = I       -->       A(4-I) = 4-I
ENDDO                    ENDDO
```

To illustrate the effect of a loop reversal, the example below shows the computations performed by a loop before and after loop reversal, during each iteration of the loop, respectively:

| Original Loop    | Reversed Loop |
|------------------|---------------|
| Iter 1: A(1) = 1 | A(3) = 3      |
| Iter 2: A(2) = 2 | A(2) = 2      |
| Iter 3: A(3) = 3 | A(1) = 1      |

It can be seen that the order in which the elements of array A are computed is reversed by the reversed loop and yet the end results are the same, i.e. array A is assigned values (1, 2, 3).

Loop Fusion is a combination of two or more adjacent loops, both with the same number of iterations, into a single loop (L1 and L2 are labels used to identify the loops). For example:

```
L1:   DO I = 1, 3            L3:   DO I = 1, 3
        A(I) = I                     A(I) = I
      ENDDO          -->             B(I) = A(I)
L2:   DO I = 1, 3                  ENDDO
        B(I) = A(I)
      ENDDO
```

After the loop fusion transformation shown above, the same computations performed by the two fusion candidate loops L1 and L2 are performed by the single fused loop L3, i.e. arrays A and B are assigned values (1, 2, 3).

Loop fusion has potential benefits in reducing the runtime of a program. The most important ones are:

1. It enables the exploitation of memory reuse across loops, which can have significant positive impact on the program's run time performance because it can reduce, even eliminate, cache and Translation Lookaside Buffer misses by bringing close together (in time) multiple accesses to the same or nearby memory locations.

2. It reduces the overhead for the run time execution of the loop by reducing the number of termination tests and branching instructions needed to restart the iterations required for the execution of each of the original loops down to that required for the single fused loop.

A loop fusion can only "legally" be performed under the following conditions:

1. The candidate loops must be adjacent to each other in the program, i.e. there must be no other statements between the two loops.

2. The candidate loops must have identical numbers of iterations.

3. The fused loop must perform the same computation as the candidate loops.

The procedure employed to test for the legality of a loop fusion operation is often called "data dependence analysis". See Zima et al., "Supercompilers for Parallel and Vector Computers" Addison Wesley, 1991. "Reuse" is a further test that is used to test whether a revised code sequence operates more efficiently (or "profitably") than the unrevised code sequence.

Recall that loop fusion can only be performed when the candidate loops have the same number of iterations and that the fused loop must perform equivalent computations as that performed by the individual candidate loops. To enable fusion of loops, loop peeling on one of the loops has been used when candidate loops do not have the same number of iterations. Consider the following two loops L1 and L2 below. They cannot be directly fused because L1 contains one more iteration than L2 does:

```
L1:   DO I = 1, 3       L2:   DO J = 2,3
        A(I) = I                B(J) = A(J)
      ENDDO                   ENDDO
```

However, if the first iteration of L1 is peeled from the loop, then the remainder of Loop L1 (i.e., L1') and Loop L2 can be fused to form loop L3 as shown below:

```
Peel:  A(1) = 1                    A(1) = 1
L1':   DO I = 2, 3         L3:   DO I = 2, 3
         A(I) = I                   A(I) = I
       ENDDO         -->            B(I) = A(I)
L2:    DO J = 2, 3               ENDDO
         B(I) = A(I)
       ENDDO
```

The problem in practice is that neither loop peeling nor loop reversal is guaranteed to enable legal and profitable loop fusion. Furthermore, loop peeling or loop reversal by themselves may cause loop performance deterioration, as the former increases the size of the program and the latter changes the data dependencies of the loop, which may disable other profitable transformations. The prior art does teach the determination of the legality and profitability of loop fusion. See Carr et al., "Compiler Optimizations for Improving Data Locality", Proc. of ASPLOS VI, San Jose, Calif., October, 1994. Also the prior art has used loop reversal to enable loop permutation, but the use of loop reversal to enable legal and profitable loop fusion is, to Applicants' knowledge, not known to be in the prior art.

Notwithstanding the use of loop peeling to enable subsequent loop fusion, it often occurs that a data dependency test on a pair of loops will indicate a resultant illegality if the loops are fused. In such case, a fusion action on the loops is inhibited. Nevertheless, the important operational efficiencies which can be achieved through loop fusion are sufficiently important to justify explorations of other loop manipulations to enable subsequent fusion actions. Accordingly, there is a need for an improved compiler method for the generation of fused loop sequences.

SUMMARY OF THE INVENTION

A compile method employs loop fusion to improve execution of a first loop and a second loop in a code sequence. A compile method first peels one or more loop iterations from one of the loops to cause each of the loops to exhibit an equal number of loop iterations. Thereafter, an attempt is made to fuse the first and second loops, upon a condition that the resulting fused loop produces a same computational result as would be produced if the first loop and second loop were not fused. If the condition is not met, a loop reversal is performed on one of the loops and a fusing action is again attempted; if the attempted fusing action of the loops does not fulfill the condition, a loop reversal is performed on the other loop and a fusing action is again attempted. The combined loop peeling/loop reversal actions provide a higher probability of an ability to fuse the loops than otherwise.

DETAILED DESCRIPTION OF A PREFERRED EMBODIMENT

The invention provides a technique that uses loop peeling and/or loop reversal to enable legal and profitable loop fusions in situations where the candidate loops do not have the same number of iterations and/or the fused loop does not perform equivalent computations as the candidate loops do.

Loop reversal is used to enable loop fusion when directly fusing the candidate loops yields a fused loop that does not perform the equivalent computations as the candidate loops or the fused loop is no more efficient at run time than the original loops. Consider the example below:

| L1: | DO I = 1, 3 | | L3: | DO I = 1, 3 |
|---|---|---|---|---|
| | A(I) = I | | | A(I) = I |
| | ENDDO | --> | | B(4-I) = A(4-I) |
| L2: | DO I = 1, 3 | | | ENDDO |
| | B(4-I) = A(4-I) | | | |
| | ENDDO | | | |

The fused loop L3 (on the right above) is not semantically equivalent to loops L1 and L2 (on the left above) because the execution of fused loop L3 will produce different values for the same elements of array B than those produced by the execution of the original loops L1 and L2. Suppose, before Loop L1 is executed, the elements of array A contain values (0, 0, 0), respectively. After Loop L1 is executed, array A becomes (1, 2, 3). After Loop L2 is executed, array B contains (1, 2, 3) as well.

However, after execution of fused loop L3, array A contains (1, 2, 3) but array B contains (1, 2, 0), which is not the same. The invention solves this problem by first applying loop reversal to Loop L2, yielding Loop L2' and then applying loop fusion to Loop L1 and Loop L2' to produce the fused Loop L3' as shown below:

| L1: | DO I = 1, 3 | | L3': | :DO I = 1, 3 |
|---|---|---|---|---|
| | A(I) = I | | | A(I) = I |
| | ENDDO | --> | | B(I) = A(I) |
| L2': | :DO I = 1, 3 | | | ENDDO |
| | B(I) = A(I) | | | |
| | ENDDO | | | |

It must be noted that loop reversal cannot always be applied to a loop to produce an equivalent loop. Data dependence analysis is used to determine whether a loop reversal can be safely applied.

Figure 1:
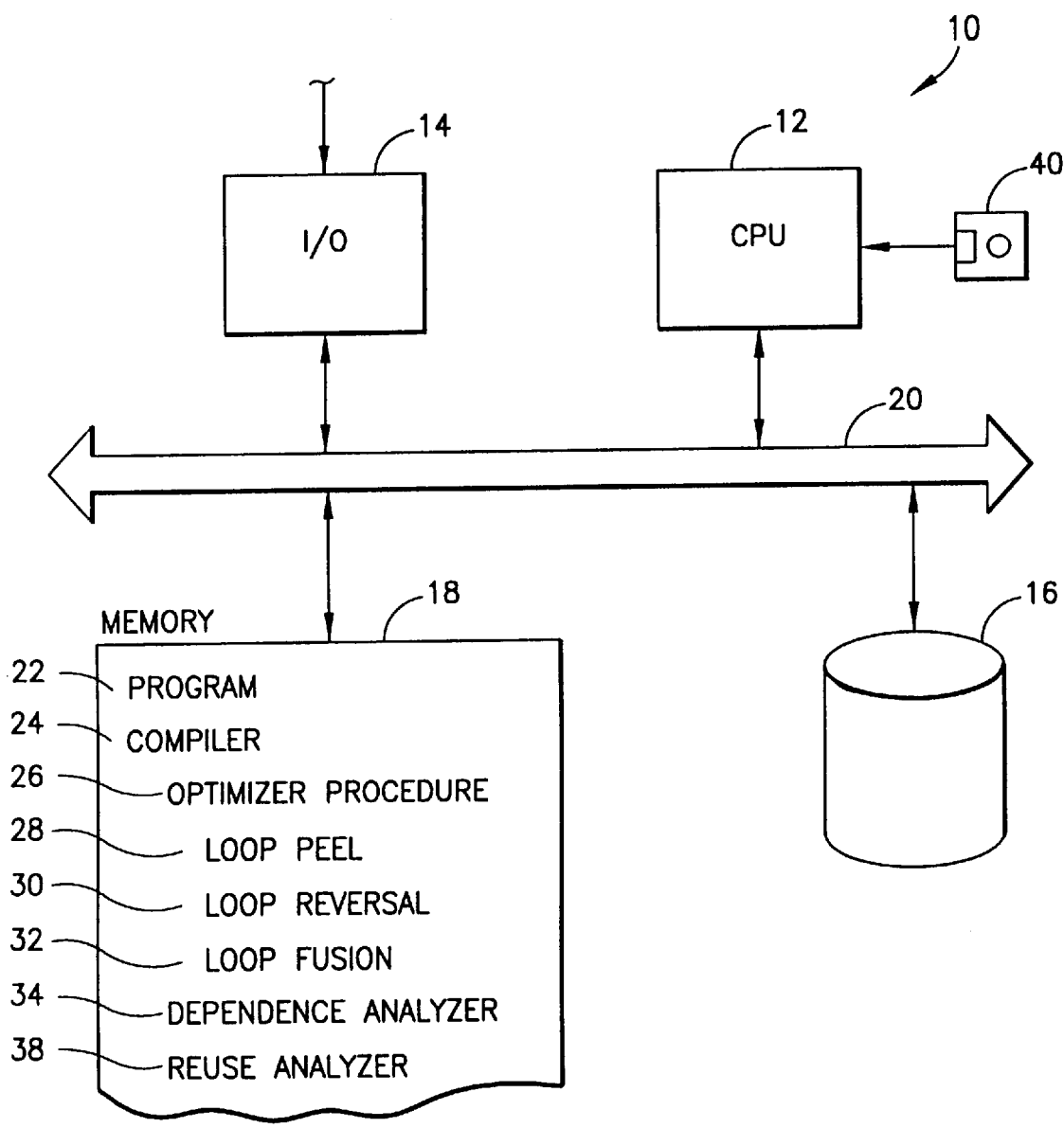
FIG. 1 is a high level block diagram of a computer system adapted to perform the invention.

Referring now to FIG. 1, a computer 10 includes a central processing unit (CPU) 12, an input/output module 14, a disk drive memory 16 and a random access memory (RAM) memory 18. Each of the aforesaid elements of computer 10 is coupled by a bus 20 which enables communication therebetween. Input/output module 14 is utilized to receive a program 22 for storage in either disk drive 16 or memory 18.

Also stored in either memory 18 or disk drive 16 is a compiler program 24 which includes an optimizer procedure 26, and the following procedures: a loop peel procedure 28; a loop reversal procedure 30; and a loop fusion procedure 32. Compiler 24 further includes a dependency analyzer 34 and a reuse analyzer 38.

While it will be hereafter assumed that each of the aforesaid procedures and subprocedures is contained within memory 18 and operate, in conjunction with CPU 12, to perform the invention hereof, it is to be understood that each of the aforesaid procedures can be present on a magnetic disk or other storage media 40 for direct loading, via CPU 12, into memory 18 or disk drive 16, as the case may be.

Briefly stated, upon receipt of a program 22 to be compiled, compiler 24 is started and commences an analysis of program 22. While many analytical procedures are carried out, in regards to the invention to be described herein, the initial action of compiler 24 is identification of loops that are present in program 22. A further determination is made as to whether such loops are capable of being fused. As will be understood from the description below, once the loops are identified, loop peel procedure 28, loop reversal procedure 28 or a combination thereof are attempted in order to enable a loop fusion. During the operation of these procedures, dependency analyzer 34 is operated to determine whether a loop reversal and/or a loop fusion will be "legal", i.e., that the resulting fused loop will provide an identical output as the individual loops, prior to fusion. Further, reuse analyzer procedure 38 is operated to determine whether the resulting reversal and/or fusion actions will be profitable or pessimizing. If pessimizing, a fusion action is not undertaken.

Figure 2:
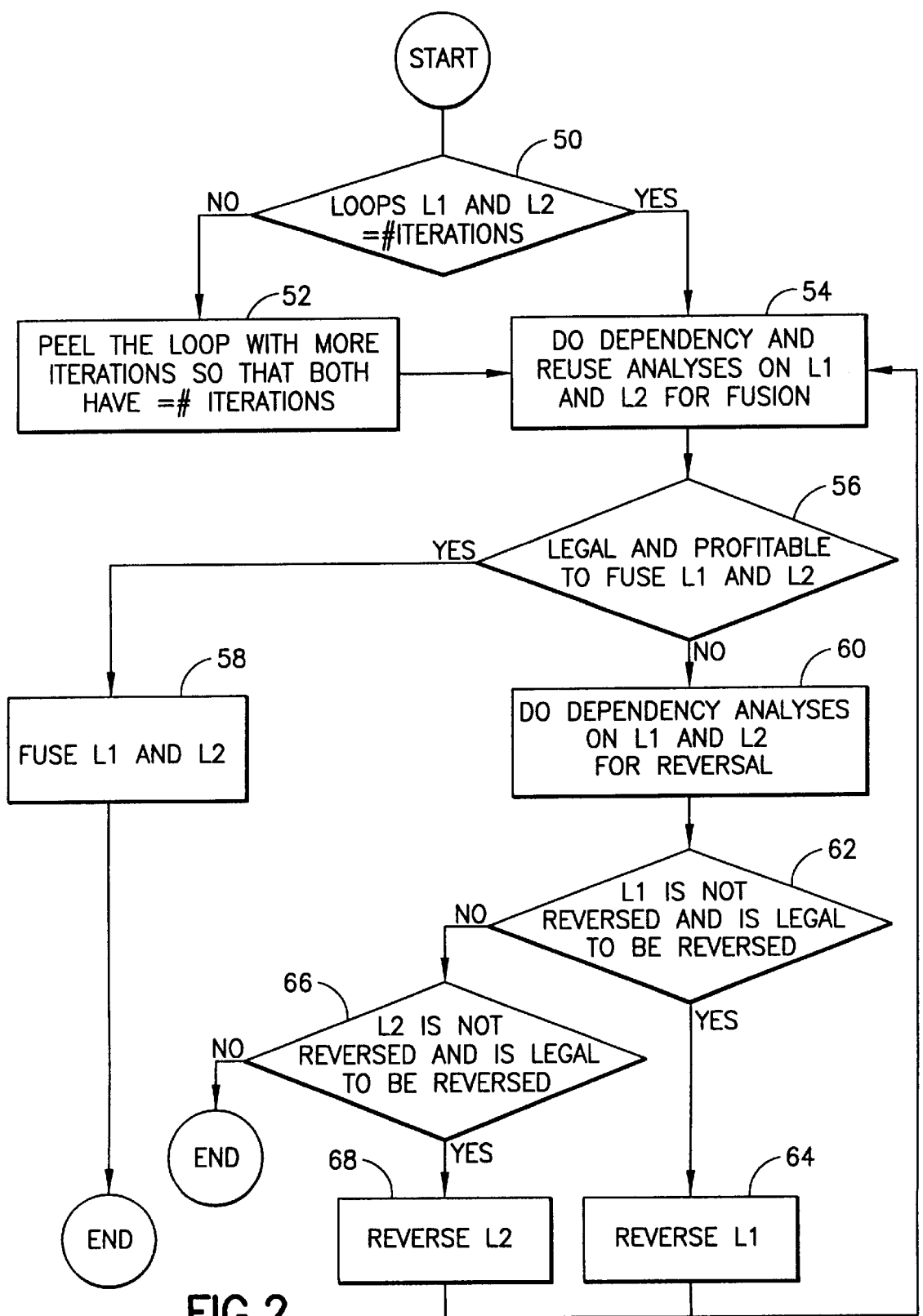
FIG. 2 is a high level logical flow diagram illustrating the steps of the invention.

Turning now to FIG. 2, the method of the invention will be described in relation to the steps shown therein. Thereafter, a pseudo-code listing of the algorithm employed by the invention will be illustrated. Initially, it is to be assumed that compiler 24 has identified loops that are present in program 22. Assume further that loops L1 and L2 have been identified and that they are adjacent in program 22 (i.e., no other code is present therebetween).

Assuming adjacency, loops L1 and L2 are examined to determine if they have an equal number of iterations (decision box 50). If no, the loop with the greater number of iterations is peeled until both loops L1 and L2 have an equal number of iterations (box 52). More specifically, each peeled iteration is appended as an in-line code sequence with the variable that would have been otherwise handled within the loop.

Now that loops L1 and L2 have the same number of iterations, dependency and reuse analyses are performed thereon to determine if a fusion action can be performed both legally and profitably (box 54). If yes (decision box 56), a fusion action is undertaken (box 58), and the procedure is at an end. More specifically, the dependency analysis determines whether the data dependencies that are present in loops L1 and L2 will be altered by a resulting fusion action. If so, the fusion action cannot be undertaken, immediately. The reuse analysis determines whether a loop resulting from the fusion of L1 and L2 will operate in a more efficient manner than loops L1 and L2, operating separately. Here again, only if the answer is yes does the loop fusion procedure 32 indicated in box 58 operate upon loops L1 and L2.

Otherwise, the procedure moves to box 60 wherein a dependency analysis is performed on loops L1 and L2 to determine if a reversal of either loop will result in an illegal operation. In specific, it is determined whether the data dependencies in a loop will be altered if a reversal is attempted, in which case, the reversal cannot be performed. Accordingly, if a loop under consideration is not already reversed (decision box 62) (e.g. in this case loop L1) and if the dependency analysis has indicated that it is legal to attempt to reverse loop L1 (decision box 62), loop reversal procedure 30 operates to reverse the sequence of operations of loop L1 (box 64). The procedure then recycles back to box 54 where dependency and reuse analyses are performed on reversed loop L1 and nonreversed loop L2. If the potential fusion is both legal and profitable, then the fusion action is performed (box 58).

Otherwise, the procedure cycles down to decision box 66 where it is determined whether it is legal to reverse loop L2 (and loop L2 has not theretofore been reversed). If yes, loop reversal procedure 30 operates upon loop L2 (box 68) and the procedure again returns to box 54. Thereafter, if it is found that loop L1 and loop L2 may both be legally fused and that the resulting fusion provides a profitable result, then L1 and L2 are fused (box 58). Otherwise, the procedure is at an end.

The following pseudo code listing describes how loop peeling, loop reversal, and loop fusion are integrated to achieve legal and profitable transformations and to avoid pessimizing or unnecessary ones.

```
Input: Two adjacent Loops L1 and L2
Output:L1 and L2 or an equivalent and more efficient
       Loop L3
Algorithm
   START:
       Loop1 = L1
       Loop2 = L2
       if L1 and L2 have identical number of iterations then
           goto DO_FUSION
       else (if L1 has one more iteration than L2) then
           Peel off the first iteration of L1
           Loop1 = Remainder of L1
           goto  DO_FUSION
       else (if L2 has one more iteration than L1) then
           Peel off the last iteration of L2
           Loop2 = Remainder of L2
           goto DO_FUSION
   DO_FUSION:
       if it is legal and profitable to fuse Loop1 and
       Loop2 then
           L3 = Fuse Loop1 and Loop2
           goto STOP
       else if L1 is not reversed and it is legal to
       reverse L1 then
           Loop1 = Reversed L1
           goto DO_FUSION
       else if L2 is not reversed and it is legal to
       reverse L2 then
           Loop2 = Reversed L2
           goto DO_FUSION
       else
           goto STOP
   STOP:
```

In the above algorithm, the fusion of two adjacent loops is used to illustrate the overall procedure. In practice this algorithm applies to any number of adjacent loops and can be extended to work for loops whose iteration counts differ by a number that is greater than one.

It should be understood that the foregoing description is only illustrative of the invention. Various alternatives and modifications can be devised by those skilled in the art without departing from the invention. Accordingly, the present invention is intended to embrace all such alternatives, modifications and variances which fall within the scope of the appended claims.

We claim:

1. A compile method which employs loop fusion to improve execution of a first loop and a second loop in a code sequence, said first loop and second loop including different numbers of loop iterations, said compile method comprising the steps of:

a) peeling one or more loop iterations from one said loop to cause each said loop to exhibit an equal number of loop iterations;

b) fusing said first loop and second loop upon a condition that a resulting fused loop produces a same computational result as would be produced if said first loop and second loop were not fused;

c) performing a loop reversal on one said loop and repeating step b), if the condition of step b) is not met as a result of a prior fusing action; and d) performing a loop reversal on another said loop and repeating step b), if the condition of step b) is not met as a result of a fusing action subsequent to step c).

2. The compiler method as recited in claim 1, wherein step a), subsequent to said peeling, further comprises the substep of:

a1) analyzing said first loop and said second loop to assure that data dependencies in both said first loop and said second loop will not be violated in an event of a fusion of said first loop and said second loop.

3. The compiler method as recited in claim 2, wherein step a) subsequent to substep a1), further comprises the substep of:

a2) upon a finding in substep a1) that data dependencies in at least one said loop will be violated in an event of a fusion of said first loop and said second loop, analyzing said first loop and said second loop to assure that a reversal of at least one said loop will not violate data dependencies in said loop to be reversed and, if so, proceeding to execution of step b).

4. The compiler method as recited in claim 1, wherein step a), subsequent to said peeling, further comprises the substep of:

a1) analyzing said first loop and said second loop to assure that performance of a fused loop from said first loop and said second loop will exhibit an improvement in performance over performance of said first loop and said second loop, before fusion.

5. A memory media for controlling a computer to perform a compile action on a code sequence, said compile action including loop fusion to improve execution of a first loop and a second loop in said code sequence, said first loop and second loop including different numbers of loop iterations, said memory media comprising:

a) means for controlling said computer to peel one or more loop iterations from one said loop to cause each said loop to exhibit an equal number of loop iterations;

b) means for controlling said computer to fuse said first loop and second loop upon a condition that a resulting fused loop produces a same computational result as would be produced if said first loop and second loop were not fused;

c) means for controlling said computer to perform a loop reversal on one said loop and to cause a repetition of operation of means b), if said condition is not met as a result of a prior fusing action; and d) means for controlling said computer to perform a loop reversal on another said loop and to cause a repetition of operation of means b), if said condition is not met as a result of a fusing action subsequent to operation of means c).

6. The memory media as recited in claim 5, wherein means a) subsequent to said peeling, controls said computer to analyze said first loop and said second loop to assure that data dependencies in both said first loop and said second loop will not be violated in an event of a fusion of said first loop and said second loop.

7. The memory media as recited in claim 6, wherein means a) further controls said computer, upon finding that data dependencies in at least one said loop will be violated in an event of a fusion of said first loop and said second loop, to analyze said first loop and said second loop to assure that a reversal of at least one said loop will not violate data dependencies in said loop to be reversed and, if so, causes operation of means b).

8. The memory media as recited in claim 5, wherein means a), subsequent to said peeling, further controls said computer to analyze said first loop and said second loop to assure that performance of a fused loop from said first loop and said second loop will exhibit an improvement in performance over performance of said first loop and said second loop, before fusion.

* * * * *